United States Patent [19]

Yamanouchi et al.

[11] Patent Number: 5,256,482
[45] Date of Patent: Oct. 26, 1993

[54] CROSS-LINKED POLYETHYLENE INSULATED CABLES

[75] Inventors: Shosuke Yamanouchi; Sadao Fukunaga; Hironaga Matsubara, all of Osaka, Japan

[73] Assignee: Sumitomo Electric Industries, Osaka, Japan

[21] Appl. No.: 635,056

[22] Filed: Dec. 28, 1990

Related U.S. Application Data

[63] Continuation-in-part of Ser. No. 68,799, Jun. 29, 1987, abandoned, which is a continuation of Ser. No. 503,400, Jun. 13, 1983, abandoned.

[30] Foreign Application Priority Data

Jun. 23, 1982 [JP] Japan ............................. 57-108959

[51] Int. Cl.$^5$ .............................................. D02G 3/00
[52] U.S. Cl. .................................... 428/375; 428/379; 428/383; 174/110 SR; 174/110 PM; 174/120 SR; 174/110 V; 525/194
[58] Field of Search ........................ 428/375, 379, 383; 174/110 SR, 10 U, 110 PM, 120 SR; 525/194, 222

[56] References Cited

U.S. PATENT DOCUMENTS 4,412,938 11/1983 Kakizaki et al. ................. 428/375

FOREIGN PATENT DOCUMENTS 37668 9/1979 Japan .
29008 11/1979 Japan .

Primary Examiner—Patrick J. Ryan
Assistant Examiner—Newton O. Edwards
Attorney, Agent, or Firm—Sughrue, Mion, Zinn, Macpeak & Seas

[57] ABSTRACT

A cross-linked polyethylene insulated cable which is prepared by extrusion coating a polyethylene composition on a conductor, the polyethylene composition comprising polyethylene, more than 10% to less than 30% by weight of an ethylene-vinyl acetate copolymer having a vinyl acetate (hereinafter referred to as VA) content of about 28% to about 33% by weight, the EVA having an average particle diameter of less than 1.7 μm (average of maximum 5 values), and an organic peroxide, and thereafter cross-linking the thus coated polyethylene composition.

4 Claims, 1 Drawing Sheet

CROSS-LINKED POLYETHYLENE INSULATED CABLES

CROSS-REFERENCE TO RELATED APPLICATIONS

This application is a continuation-in-part application of application Ser. No. 07/068,799, filed Jun. 29, 1987, now abandoned, which is a continuation of application Ser. No. 06/503,400, filed Jun. 13, 1983, now abandoned.

FIELD OF THE INVENTION

The present invention relates to electric wires or cables. More particularly, the present invention relates to electric wires or cables having longer service life.

BACKGROUND OF THE INVENTION

Electric wires or cables having dielectric layers of polyolefins such as a polyethylene, cross-linked polyethylene and the like are in wide use. These polymers have in recent years been improved so that they are able to withstand high applied voltages. One important problem at present with these electric wires and cables is that they undergo a gradual degradation with time under continuously applied voltages, resulting in a reduction in their capability to withstand applied voltages. Because the service life of electric wires or cables is as long as thirty years, the initial thickness of the dielectric layers must be increased to compensate for the reduction in their ability to withstand applied voltages with the passage of time.

Moreover, recent urban developments have required increased power transmission capacity for electric wires or cables while keeping the volume thereof as small as possible. Therefore, a problem has developed in that electric wires or cables, having a dielectric layer consisting essentially of a polyolefin, require the ability to withstand increasing transmission voltage without increasing the thickness of the dielectric layer.

It is generally believed that the degradation referred to above results from the formation of "water trees" in a cross-linked polyolefin insulation.

Various approaches to overcome the above problem have been considered, including preventing the occurrence of the above degradation, whereby the decrease in capability to withstand applied voltages during a thirty year service life need not be taken into account, and the requirements of urban areas regarding high transmission capability and low volume can be met.

For example, improved cables or cable joints are described in Japanese Patent Publication No. 37668/79, Japanese Utility Model Publication No. 29008/74, Japanese Patent Publication No. 51180/81 and corresponding U.S. Pat. No. 4,092,688. In these cables or joints a polyethylene composition with an ethylene-vinyl acetate copolymer compounded therewith is used as an insulating material, whereby resistance against degradation has been improved to a certain extent.

Recently, however, it has been discovered that when cross-linked polyethylene cables, particularly those cables covered with an insulating material, are used at high temperatures (e.g., 90° C.) for long periods of time, they are seriously degraded.

SUMMARY OF THE INVENTION

The inventors, taking note of the above points, performed extensive research on the aging of electric wires or cables of the foregoing type, and found that aging is primarily caused by trees (or electrochemical trees, as they are sometimes termed) which are generated in the polyolefin dielectric from voids that develop in the polyolefin dielectric material. Many trees are generated from voids, especially at high temperature such as 90° C.

The degradation described above can be avoided by preventing the generation of trees from the voids in dielectric polyolefin material. As a result, the thickness of the dielectric layer can be decreased significantly.

A primary object of the present invention is to provide electric wires or cables in which the development of trees, especially at high temperature, is prevented and longer service life is obtained.

To achieve the above and other objects, and in accordance with its purpose, the present invention provides a cross-linked polyethylene insulated cable which is prepared by extrusion coating a polyethylene composition on a conductor, the polyethylene composition comprising polyethylene, more than 10% to less than 30% by weight of an ethylene-vinyl acetate copolymer (hereinafter referred to as EVA) having a vinyl acetate (hereinafter referred to as VA) content of about 28% to about 33% by weight, the EVA having an average particle diameter of less than 1.7 μm (average of maximum 5 values), and an organic peroxide, and thereafter cross-linking the thus coated polyethylene composition.

By using the electric wires or cables of the present invention, the disadvantages of the prior art are overcome in that the development of trees is prevented. The wires or cables of the present invention provide a service life several to several tens times longer than that of a conventional polyolefin dielectric insulated wire or cable. As a result, the present inventors have succeeded in significantly decreasing the initial thickness required of the polyolefin dielectric layer in such wires or cables.

The cable of the present invention shows greatly improved resistance to degradation under continuously applied voltages at high temperature for extended periods of time. Thus, the cable has a long service life even when used under conditions of high temperature for extended periods of time.

DETAILED DESCRIPTION OF THE INVENTION

The preferred range of melt index of the polyethylene used in the present invention is about 0.5 to about 10, and that of the EVA is about 0.3 to about 100.

The EVA is present in the polyethylene composition in an amount of more than 10% to less than 30% by weight based on the total amount of polyethylene and the EVA.

The VA content of the ethylene-vinyl acetate copolymer as used herein is from about 28% to about 33% by weight, preferably 30% by weight.

Organic peroxides which can be employed in the present invention include conventional organic peroxide cross-linking agents for a polyethylene. Preferred examples of the organic peroxides are dicumyl peroxide, di-tert-butyl peroxide and 2,5-dimethyl-2,5-di(tert-butyl peroxy) hexane. The amount of the organic peroxide is not llimited, but is preferably about 1% to about 7% by weight based on the total amount of the polyethylene and the EVA.

The polyethylene composition used in the present invention may further contain an antioxidant such as 4,4'-thiobis(3-methyl-6-tert-butylphenol).

A polyethylene composition having the above specific narrow ranges of EVA and VA contents is mixed until the EVA in the composition becomes very fine particles having a diameter of less than 1.7 microns (average of maximum 5 values). When the EVA particle size of the composition is 1.7 microns or less, the breakdown time of the composition is remarkably increased.

A polyethylene composition in accordance with the present invention containing an EVA copolymer having an average particle size (diameter) of less than 1.7 microns can be achieved by subjecting a polyethylene composition containing more than 10% to less than 30% by weight of EVA having a VA content of about 28% to about 33% by weight and an organic peroxide to mechanical mixing at a high shearing rate. Such mixing can be performed by an intensive mixer.

The term "intensive mixer" includes batch mixers, such as Banbury mixers, and continuous mixers, and includes a two-shaft mixer (twin screw mixer), a three-shaft mixer (triple screw mixer) and a more than three-shaft mixer. These multishaft mixers provide high shearing rates and remarkable dispersion and distribution of the composition that is being mixed.

In a two or more-shaft mixer, the shafts rotate relatively to each other, that is, the shafts rotate in opposite directions to each other, and this mechanism provides a high shearing rate. Since the particle size usually depends on the shearing rate of a mixer, EVA particles treated by two or more-shaft mixers become fine.

Figure 5:
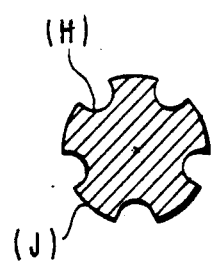
FIGS. 4 and 5 show another embodiment of a mixer which can be used in the practice of the present invention.
Figure 2:
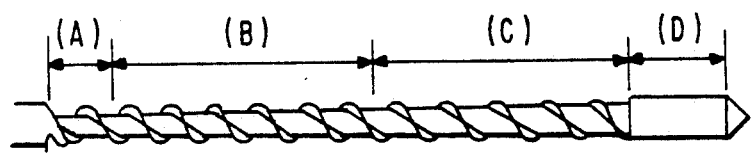
FIG. 2 is a cross-sectional view of a conventional single-shaft screw.
Figure 3:
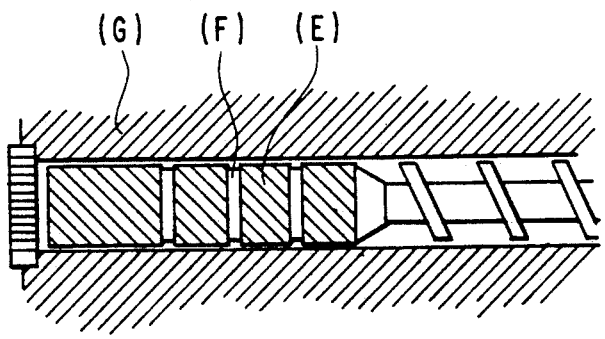
FIG. 3 is a cross-section view of a single-shaft screw mixer which has been provided with a mixing zone.
Figure 4:
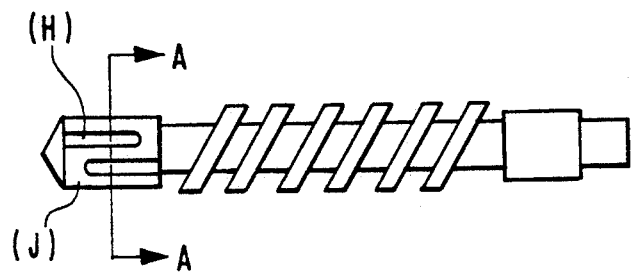

In the present invention, a single-shaft mixer can also be used to obtain an EVA particle size of less than 1.7 microns provided that the single shaft mixer has a mixing zone. A single-shaft mixer typically provides an inferior dispersion compared with a two or more-shaft mixer. In order to increase the dispersion effect of a single-shaft mixer, a mixing zone is added to a single-shaft mixer in the present invention. FIG. 2 shows a cross-sectional figure of a conventional single-shaft screw that has a feed zone (A), a compression zone (B), a metering zone (C) and a torpedo (D). A mixing zone is created when a certain form is given to the torpedo. FIG. 3 shows a torpedo (E) with slanting channels (F) that create a mixing zone within a barrel (G). FIGS. 2 and 3 correspond to FIGS. 170 and 173 shown in Takuji Shimizu, *Problems Concerning Plastics Extruding Techniques*, published by Mitsubishi Monsanto Chemical Company, (December, 1961) pages 134 and 137. FIG. 4 shows another embodiment of a mixing zone which is created by channels (H) in a torpedo (J). FIG. 5 is a sectional view taken along lines A—A of FIG. 4 and shows the channels in greater detail.

When a continuous mixer, such as a double screw mixer or a single screw mixer is employed, the mixing time is defined as detention time in a barrel. The detention time is defined as the amount of resin in the mixer (kg)/the rate at which resin which leaves the mixer (kg/minutes). The barrel is a cylinder in which one or more screws of the mixer are contained. When using a single screw mixer, the mixing time can be from about 2 to about 16 minutes, such as about four minutes. When using a double screw mixer, the mixing time can be from about 3 to about 24 minutes, such as about 6 minutes.

When a batch mixer is employed, the mixing time is defined as the time during which the batch is subjected to mixing in the mixer. When a Banbury batch mixer is employed, the mixing time can be, for example, from about 6 minutes to about 48 minutes, such as about 12 minutes.

Mixing times greater than the above mixing times generally do not significantly affect particle size.

The polyethylene composition is mixed until the EVA average particle size is less than 1.7 microns. A preferred range for the average EVA particle size is from 0.8 to 1.4 microns. The average EVA particle size is measured by selecting from among the EVA particles, the largest one, the second largest one, the third largest one, the fourth largest one and the fifth largest one, and then calculating the average size of these five particles (average of maximum 5 values)

Particle size can be calculated using an electron photomicrograph of the particles. The "maximum" value is the size of the biggest particle in the photograph, and "average of maximum 5 values" is the average size of the five biggest particles in the photograph. Five values were chosen since the use of only the maximum value can produce large sampling errors. Thus, for the purpose of minimizing sampling errors, maximum values were used in combination with average maximum values.

In the cross-linked polyethylene insulated cables of the present invention, the degree of cross-linking is not limited but is preferably about 60% to about 95%.

The present invention will hereinafter be explained in detail by reference to the following examples and comparative examples.

EXAMPLES 1 to 5

Figure 1:
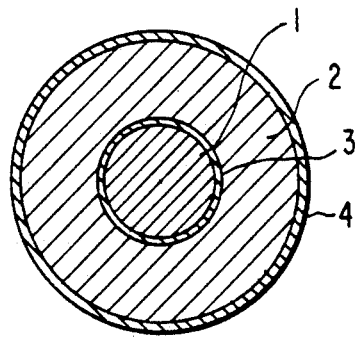
FIG. 1 is a cross-sectional view of a cross-linked polyethylene cable.

Cross-linked polyethylene insulated cables (150 mm$_2$, 60 kV class) were procured using the compositions shown in Table 1. FIG. 1 shows a cross-sectional view of each cross-linked polyethylene cable comprising a conductor 1, an insulating material 2, an inner semiconductive layer 3 and an outer semiconductive layer 4. Semiconductive layers 3 and 4 were each made of NUC 0580 (trade name, produced by Nippon Unicar Co., Ltd.). NUC 0580 comprises EVA containing carbon, dicumyl peroxide and antioxidant. The thickness of the insulating layer 2 is 11 mm, that of the inner semi-conductive layer 3 is 0.8 mm and that of the outer semi-conductive layer is 0.8 mm.

A current was circulated that made the temperature of the conductor 90° C., and a voltage of 160 kV was applied. The time to breakdown the cable upon application of constant voltage was measured to evaluate degradation of the cable at high temperature. These times are hereinafter referred to as the "breakdown time", and are shown in Table 1 with the breakdown time (334 hours) of Comparative Example 1 as a base (1).

The following can be seen from Table 1.

With cables produced using compositions in which 20% EVA having a VA content of 15% or 25%, respectively, were compounded with polyethylene (Comparative Examples 1 and 2), the resistance to degradation at high temperatures was slightly improved as compared with the cable of Comparative Example 1, but it was not satisfactorily improved to the extent that a long service life (e.g., 30 years) could be guaranteed.

On the other hand, when EVA having a VA content of about 28% was used (Example 1), degradation at high temperature was greatly improved. In particular, when the VA content was 30% (Example 2), the cable showed a very high resistance against degradation. Also, at a VA content of 33%, excellent characteristics were obtained.

However, when the VA content was further increased, e.g., EVA having a VA content of 35% was used (Comparative Examples 4 and 5), the characteristics of the resulting cables were slightly improved as compared with the cable of Comparative Example 1, but they were not satisfactory.

having a VA content of 30% (Example 5), is compounded with polyethylene, excellent resistance against degradation is obtained.

Thus, it is found that remarkably superior effects of the resistance to degradation can be obtained in the very narrow range of VA content of about 28 weight % to about 33 weight %.

Thus, it is clear from the above that the present invention is a selective invention which provides superior and unexpected results when a narrow VA range is employed.

EXAMPLE 6

The following experiment shows the increase in breakdown time when the specific polyethylene composition of the present invention is mechanically mixed using a multi-shaft intensive mixer or single shaft mixer

TABLE 1

| | Comp. Ex. 1 | Comp. Ex. 2 | Comp. Ex. 3 | Ex. 1 | Ex. 2 | Ex. 3 | Comp. Ex. 4 | Comp. Ex. 5 | Comp. Ex. 6 | Comp. Ex. 7 | Ex. 4 | Ex. 5 | Comp. Ex. 8 | Comp. Ex. 9 | Comp. Ex. 10 |
|---|---|---|---|---|---|---|---|---|---|---|---|---|---|---|---|
| Polyethylene*[1] | 100 | 80 | 80 | 80 | 80 | 80 | 80 | 60 | 90 | 60 | 85 | 75 | 70 | 70 | 50 |
| EVA*[2], VA = 15% by wt. | | 20 | | | | | | | | | | | 10 | 30 | 50 |
| EVA*[3], VA = 25% by wt. | | | 20 | | | | | | | | | | | | |
| EVA*[4], VA = 28% by wt. | | | | 20 | | | | | | | | | | | |
| EVA*[5], VA = 30% by wt. | | | | | 20 | | | | | | 15 | 25 | | | |
| EVA*[6], VA = 33% by wt. | | | | | | 20 | | 40 | 10 | | | | | | |
| EVA*[7], VA = 35% by wt. | | | | | | | 20 | | | | | | | | |
| DCP*[8] | 2 | 2 | 2 | 2 | 2 | 2 | 2 | 2 | 2 | 2 | 2 | 2 | 2 | 2 | 2 |
| SWC*[9] | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Breakdown Time (with that of Comparative Example 1 as 1) | 1 | 1.1 | 1.2 | 3.3 | 4.0 | 3.1 | 1.3 | 1.3 | 1.1 | 1.2 | 3.5 | 3.3 | 1.4 | 1.5 | 1.4 |

Note:
*[1]Density = 0.92. M.I. = 1.3 (produced by Sumitomo Chemical Co., Ltd.)
*[2]Density = 0.94. M.I. = 0.6 (produced by Sumitomo Chemical Co., Ltd.)
*[3]Density = 0.95. M.I. = 3 (produced by Sumitomo Chemical Co., Ltd.)
*[4]Density = 0.95. M.I. = 15 (produced by Sumitomo Chemical Co., Ltd.)
*[5]Density = 0.95. M.I. = 20 (produced by Sumitomo Chemical Co., Ltd.)
*[6]Density = 0.96. M.I. = 30 (produced by Sumitomo Chemical Co., Ltd.)
*[7]Density = 0.96. M.I. = 60 (produced by Sumitomo Chemical Co., Ltd.)
*[8]Dicumyl peroxide (produced by Mitsui Petrochemical Co., Ltd.)
*[9]4,4'-Thiobis(3-methyl-6-tert-butylphenol) as anti-oxidant (produced by Kawaguchi Chemical Co., Ltd.)

The above densities were all measured at a temperature of 20° C. M.I. was measured at a temperature of 190° C. under a weight of 2,160 g.

The amount of EVA having a VA content falling within the above-described range that is compounded with the polyethylene is critical in the present invention.

With a cable produced using a composition in which the same EVA as was used in Example 3 is used, but the amount of the EVA compounded is 40% or higher as in Comparative Example 5, the resistance to degradation is only slightly superior to that of Comparative Example 1, but is not satisfactorily improved. The same is the case with Comparative Example 7. Conversely, when the same EVA as was used in Example 3 is used, but the amount of the EVA compounded is 10% or less, the resistance against degradation is not satisfactory as can be seen from Comparative Example 6.

On the other hand, cables produced using compositions in which EVA, having a VA content falling within the above-described range, i.e., 15% EVA having a VA content of 30% (Example 4) and 25% EVA with mixing zone until the EVA has an average particle size of less than 1.7 μm. The same procedure as in Example 1 generally was employed.

Each of the Compositions Nos. 1 to 12 shown in Table 2 below was mixed using the mixer disclosed in Table 2. The detention time or mixing time at which each composition was mixed is shown in Table 2. The particle size (average of maximum 5 values) of the EVA in each of Composition Nos. 1 to 12 was measured and is shown in Table 2.

Then, cross-linked polyethylene insulated cables (150 mm², 60 kV class) were produced using the Compositions Nos. 1 to 12, and the breakdown times of the cables thus produced were measured by circulating a current through the cables until the temperature of the conductors of the cables increased to 90° C. and a voltage of 160 kV was applied, and the time to breakdown was measured.

The breakdown time of the composition indicates the resistance to degradation under continuously applied voltage at high temperatures, and is evaluated by the test described above wherein a current was circulated until the temperature of the conductor reached 90° C. and a voltage of 160 kV was applied.

"Breakdown" is defined as occurring when the tree grows into the same length as the thickness of the insulating material, that is, the time from beginning of application of voltage to complete breakdown of the insulating material. The results are shown in Table 2.

EVA particle size of 0.8 to less than 1.7 μm is employed.

While the invention has been described in detail and with reference to specific embodiments thereof, it will be apparent to one skilled in the art that various changes and modifications can be made therein without departing from the spirit and scope thereof.

TABLE 2

| No. | Composition (PE/EVA ratio by wt. ratio) | Mixing Means (kind of apparatus used) | (maximum) | (Average of maximum 5 values) | Breakdown Time | Note | Detention Time/ Mixing Time (Minutes) |
|---|---|---|---|---|---|---|---|
| 1 | 78.6/21.4 (VA = 28 wt %) | Banbury mixer | 1.0 μm | 0.8 μm | 1495 Hr | Invention | 12 |
| 2 | 78.6/21.4 (VA = 28 wt %) | Double screw mixer | 1.3 μm | 1.0 μm | 1120 Hr | Invention | 6 |
| 3 | 78.6/21.4 (VA = 28 wt %) | Double screw mixer | 1.5 μm | 1.1 μm | 1150 Hr | Invention | 6 |
| 4 | 78.6/21.4 (VA = 28 wt %) | Single screw mixer | 2.1 μm | —* | 172 Hr | Comparison | 4 |
| 5 | 81/19 (VA = 33 wt %) | Banbury mixer | 1.0 μm | 0.8 μm | 1405 Hr | Invention | 12 |
| 6 | 81/19 (VA = 33 wt %) | Double screw mixer | 1.8 μm | 1.3 μm | 1050 Hr | Invention | 6 |
| 7 | 81/19 (VA = 33 wt %) | Double screw mixer | 2.0 μ | 1.4 μm | 1090 Hr | Invention | 6 |
| 8 | 81/19 (VA = 33 wt %) | Single screw mixer | 2.5 μm | 1.8 μm | 320 Hr | Comparison | 4 |
| 9 | 60/40 (VA = 15 wt %) | Banbury mixer | 1.0 μm | —* | 90 Hr | Comparison | 12 |
| 10 | 87/13 (VA = 45 wt %) | Banbury mixer | 0.8 μm | 0.6 μm | 102 Hr | Comparison | 12 |
| 11 | 78.6/21.4 (VA = 28 wt %) | Single screw mixer with mixing zone | 1.6 μm | 1.2 μm | 1100 Hr | Invention | 7 |
| 12 | 81/19 (VA = 33 wt %) | Single screw mixer with mixing zone | 1.7 μm | 1.2 μm | 1060 Hr | Invention | 7 |

*Since the particles had very irregular forms, measurement of particle size was impossible.

As can be seen from Table 2, cables prepared by using the PE compositions having a VA content of 28-33%, an EVA particle size of 0.8-1.4 μm and mixed using a two-shaft intensive mixer show very high resistance to degradation, as shown in Sample Nos. 1-3 and 5-7. On the other hand, the PE compositions having the same EVA and VA contents as Sample Nos. 1-3 and 5-7, but mixed without using a two-shaft intensive mixer and containing EVA particles having an average diameter of larger than 1.7 μm or very irregular form, show very poor resistance to degradation as shown in Sample Nos. 4 and 8. The PE compositions having EVA and VA contents outside the range of the present invention, but mixed using a two-shaft intensive mixer also show very poor resistance degradation, as shown in Samples Nos. 9 and 10.

Samples Nos. 11 and 12 were prepared with a single screw mixer having a mixing zone, and contained EVA particles having an average particle diameter of less than 1.7 microns, and show a very high resistance to degradation. Sample No. 8 which had the same composition as Sample 12, but which was prepared with a single screw mixer not having a mixing zone had an average diameter of EVA particles larger than 1.8 microns, and had a very poor resistance to degradation. The results show a dramatic increase in breakdown time when a composition having VA content of 28-33% and EVA particle size of 0.8 to less than 1.7 μm is employed.

While the invention has been described in detail and with reference to specific embodiments thereof, it will be apparent to one skilled in the art that various changes and modifications can be made therein without departing from the spirit and scope thereof.

What is claimed is:

1. A cross-linked polyethylene insulated cable which is prepared by extrusion coating a polyethylene composition on a conductor, the polyethylene composition comprising polyethylene, more than 10% to less than 30% by weight of an ethylenevinyl acetate copolymer having a vinyl acetate (hereinafter referred to as VA) content of about 28% to about 33% by weight, the ethylene-vinyl acetate copolymer having an average particle diameter of from 0.8 to 1.4 μm (average of maximum 5 values), and an organic peroxide, and thereafter cross-linking the thus coated polyethylene composition.

2. The cross-linked polyethylene cable as in claim 1, wherein the VA content of the ethylene-vinyl acetate copolymer is 30% by weight.

3. The cross-linked polyethylene cable as in claim 2, wherein the amount of the ethylene-vinyl acetate copolymer compounded is about 20% by weight based on the composition.

4. The cross-linked polyethylene cable as in claim 1, wherein the cable is prepared by mixing the polyethylene composition in an intensive mixer until the EVA in the composition has an average particle size of from 0.8 to 1.4 μm.

* * * * *